US00RE47077E

(19) United States
(12) Reissued Patent
Keller et al.

(10) Patent Number: US RE47,077 E
(45) Date of Reissued Patent: Oct. 9, 2018

(54) METHOD AND APPARATUS FOR DETACHING FROZEN CHARGE FROM A TUBE MILL

(71) Applicant: ABB Schweiz AG, Baden (CH)

(72) Inventors: Robert Keller, Baden-Dattwil (CH); Patrick Meier, Wettswil (CH)

(73) Assignee: ABB Schweiz AG, Baden (CH)

(21) Appl. No.: 14/981,620

(22) Filed: Dec. 28, 2015

Related U.S. Patent Documents

Reissue of:
(64) Patent No.: 8,662,428
Issued: Mar. 4, 2014
Appl. No.: 13/555,671
Filed: Jul. 23, 2012

U.S. Applications:
(63) Continuation of application No. PCT/EP2011/050440, filed on Jan. 14, 2011.

(30) Foreign Application Priority Data

Jan. 21, 2010 (EP) ..... 10151260

(51) Int. Cl.
*B02C 25/00* (2006.01)
*B02C 17/18* (2006.01)
*B02C 17/24* (2006.01)

(52) U.S. Cl.
CPC ..... *B02C 17/1805* (2013.01); *B02C 17/24* (2013.01); *B02C 25/00* (2013.01)

(58) Field of Classification Search
CPC ..... B02C 17/1805; B02C 17/24; B02C 25/00
See application file for complete search history.

(56) References Cited

U.S. PATENT DOCUMENTS 1,040,876 A * 10/1912 Buxton ..... B02C 17/24 241/178
2,232,696 A 2/1941 Earle
2,726,047 A * 12/1955 Treshow ..... B02C 17/24 241/178
3,390,867 A * 7/1968 Hagelucken ..... B01F 9/00 366/220

(Continued)

FOREIGN PATENT DOCUMENTS

AU 2007286366 A1 6/2007
AU 2009309253 A1 5/2010

(Continued)

OTHER PUBLICATIONS

Translation of DE 3528409, 2017.*

(Continued)

*Primary Examiner* — Patricia Engle
(74) *Attorney, Agent, or Firm* — J. Bruce Schelkopf; Taft Stettinius & Hollister LLP

(57) ABSTRACT

A method and associated apparatus for detaching a frozen charge from an inner wall of a grinding pipe of a tube mill such as is used for grinding. The method includes controlling a driving device of the grinding pipe to detach a frozen charge from an inner wall of the grinding pipe, which driving device is operable to apply a driving torque to the grinding pipe. Controlling the driving device includes varying the driving torque applied to the grinding pipe around a predetermined reference level.

20 Claims, 1 Drawing Sheet

(56) References Cited

U.S. PATENT DOCUMENTS

| | | | | | |
|---|---|---|---|---|---|
| 4,123,009 | A * | 10/1978 | Kilpinen | B02C 25/00 | 241/30 |
| 4,520,297 | A * | 5/1985 | League, IV | F27B 7/42 | 241/26 |
| 4,635,858 | A * | 1/1987 | Welch | B02C 25/00 | 241/101.3 |
| 5,698,797 | A * | 12/1997 | Fontanille | B02C 25/00 | 250/357.1 |
| 7,017,841 | B2 * | 3/2006 | Tirschler | 241/30 | |
| 8,079,536 | B2 * | 12/2011 | Becker et al. | 241/30 | |
| 2002/0175232 | A1 * | 11/2002 | Scuccato | B02C 25/00 | 241/30 |
| 2003/0052205 | A1 | 3/2003 | Tirschler | B02C 17/1805 | 241/32.5 |
| 2006/0113416 | A1 | 6/2006 | Tirschler | | |
| 2007/0145168 | A1 | 6/2007 | Theberge et al. | B02C 17/1805 | 241/30 |
| 2008/0169368 | A1 | 7/2008 | Becker et al. | B02C 17/1805 | 241/30 |
| 2010/0237175 | A1 * | 9/2010 | Becker | B02C 17/1805 | 241/30 |
| 2011/0283504 | A1 | 11/2011 | Becker et al. | | |
| 2013/0153694 | A1 * | 6/2013 | Held | B02C 17/1805 | 241/15 |

FOREIGN PATENT DOCUMENTS

| | | | |
|---|---|---|---|
| DE | 35 28 409 | A1 | 2/1987 |
| DE | 3528409 | * | 2/1987 |
| RU | 98100347 | A | 1/1998 |
| WO | 2005092508 | A1 | 10/2005 |

OTHER PUBLICATIONS

Dictionary.com definition of Jog, 2017.*

Norbert Becker et al.; The Operation Modes of a Grinding Mill With Gearless Drive; Nov. 2006; 8 pgs.; Erlangen, Germany.

Kurt Tischler; Siemens AG Email Communication; Dec. 3, 2009; 1 pg.

ABB Group; COE Minerals Processing; Grinding Mill Applications; Sep. 28, 2009; 10 pgs.; Switzerland.

International Preliminary Report on Patentability (PCT/IB/373) issued on Jul. 24, 2012, by the European Patent Office as the International Searching Authority for International Application No. PCT/EP2011/050440.

International Search Report (PCT/ISA/210) dated Jun. 7, 2011, by the European Patent Office as the International Searching Authority for International Application No. PCT/EP2011/050440.

Search Report issued on Jun. 29, 2010, by the European Patent Office for Application No. 10151260.6.

* cited by examiner

METHOD AND APPARATUS FOR DETACHING FROZEN CHARGE FROM A TUBE MILL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application claims priority under 35 U.S.C. 120 to International Application PCT/EP2011/050440 filed on Jan. 14, 2011 designating the U.S. and claiming priority to European Application No. 10151260.6 filed on Jan. 21, 2010, the entire contents of which are hereby incorporated by reference in their entireties.

FIELD

The present disclosure relates to a method and associated apparatus for detaching a frozen charge from an inner wall of a grinding pipe of a tube or pipe mill.

BACKGROUND INFORMATION

Known tube mills can be used for grinding material such as ore. Large particulate material, such as gold ore, is delivered into the grinding pipe of the tube mill where it can be mixed with grinding media charges such as balls. Water can also be added to this mixture. It is not uncommon for the use of a tube mill to be intermittent, either due to an intermittent supply of material to be ground, due to maintenance of the mill itself or due to an emergency stop of the system. During the periods when the tube mill is not is use, the charge within the grinding pipe can consolidate and become firmly stuck to the inner wall of the grinding pipe, this is referred to as "frozen charge". When the tube mill is set in motion again after a period of non-use during which frozen charge has occurred, there is a high likelihood that the frozen charge may become detached at the highest point of rotation of the grinding pipe. This will result in the frozen charge dropping onto the inner surface of the grinding pipe at the lowest point of rotation which, given the potential height of drop and the materials involved, could result in substantial damage occurring to the tube mill.

In view of this, known procedures called for a grinding pipe to be checked for frozen charge, and when detected, rotation of the tube mill is ceased immediately. Until recently the removal of frozen charge was a laborious manual process involving the use of air compressed hammers upon the charge which may, or may not, have first been softened by spraying with water.

Patent application publication DE 3528409 A1 describes an arrangement which detects the presence of frozen charges and stops rotation of the drum in the affirmative. If a tube mill is driven with constant angular speed, the corresponding torque increases to an absolute maximum indicative of loose charges starting to tumble towards the lower parts of the rotating tube. Under the presence of frozen charges however, such maximum is not observed at moderate angles of rotation.

Recently, a more efficient method and associated devices for removing such frozen charge has been disclosed in U.S. Patent Application No. 2008/0169368 (Becker et al.). This method involves controlling a gearless drive of a ring motor surrounding the grinding pipe to effect targeted detachment of frozen charge. The grinding pipe drive is operated to rotate the grinding pipe in an angular range and at an appropriated speed such that falling material does not cause damage to the grinding pipe or other components of the tube mill. An angle of rotation is set to oscillate about a predetermined angle of rotation, with a corresponding torque reference, or mean, value decreasing proportionally to the fraction of frozen charge.

A system with a driving torque applied to the grinding mill that can be both positive and negative is not suitable in mills having a geared drive as this can create a backlash of force on the gear teeth which in time will cause damage to the gears and will subsequently decrease the lifetime of the drive train.

SUMMARY

An exemplary method for detaching a frozen charge from an inner wall of a grinding pipe is disclosed, the method comprising the steps of: controlling a driving device of the grinding pipe to detach a frozen charge from an inner wall of the grinding pipe, which driving device is operable to apply a driving torque to the grinding pipe, wherein controlling the driving device comprises varying the driving torque applied to the grinding pipe about a predetermined and increasing torque reference level.

A controller for detaching a frozen charge from an inner wall of a grinding pipe, the controller comprising: a controller operable to control a drive device of the grinding pipe such that a driving torque applied by the drive device to the grinding pipe varies about a predetermined and increasing torque reference level.

DESCRIPTION OF THE DRAWINGS

These and other aspects of the disclosure will become apparent from the following descriptions when taken in combination with the accompanying drawings in which.

DETAILED DESCRIPTION

According to an exemplary embodiment of the present disclosure a method for detaching a frozen charge from an inner wall of a grinding pipe, the method includes the steps of controlling a driving device of the grinding pipe to detach a frozen charge from an inner wall of the grinding pipe, which driving device is operable to apply a driving torque to the grinding pipe. Controlling the driving device includes varying, or oscillating, the driving torque applied to the grinding pipe about a predetermined reference level which is steadily, or continuously, increasing during the variation.

By varying the driving torque applied to the grinding pipe the torque acting upon the frozen charge is also varied which facilitates the dislodging of the frozen charge.

In an exemplary embodiment, the driving torque is always kept in the same direction during such control.

Application of such driving torque prevents back-lash which causes mechanical stress on gear teeth associated with the grinding pipe thus increasing the lifespan of the grinding pipe machinery.

According to an exemplary embodiment disclosed herein varying the driving torque includes varying the driving torque sinusoidally about the predetermined reference level.

A sinusoidal varying of the driving torque results in a smoother pattern of movement being applied to the grinding pipe machinery resulting in less strain such as on the drive train mechanism of the grinding pipe.

In another exemplary embodiment, varying the driving torque includes varying the driving torque in a stepwise manner about the predetermined reference level.

A stepwise varying of the driving torque results in a greater effect of inertia acting upon the frozen charge providing an efficient dislodging process.

In yet another exemplary embodiment, varying the driving torque includes varying the driving torque in any pattern about the predetermined torque reference level, between a maximum torque level and a minimum torque level that define an increasing torque range proportional to the increasing torque reference level.

According to another exemplary embodiment of the present disclosure, there is provided apparatus for detaching a frozen charge from an inner wall of a grinding pipe. The apparatus including a controller operable, or adapted, to control a drive device of a grinding pipe such that a driving torque applied by the drive device varies about a predetermined and steadily increasing torque reference level.

By varying, about a predetermined reference level, the driving torque applied to the grinding pipe, the torque acting upon the frozen charge is also varied which facilitates the dislodging of the frozen charge such that upon dislodgement damage to the inner wall is minimised.

Figure 1:
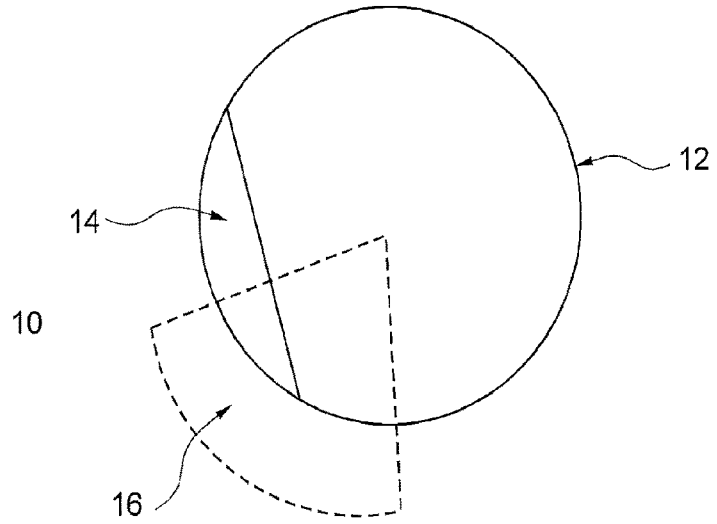
FIG. 1 is a cross sectional view of a grinding pipe inner wall in accordance with an exemplary embodiment of the present disclosure.

FIG. 1 is a cross sectional view of a grinding pipe inner wall in accordance with an exemplary embodiment of the present disclosure. As shown in FIG. 1, a grinding pipe 10 includes an inner wall 12 to which a mass of frozen charge 14 has become adhered. The frozen charge 14 can be detached from the inner wall 12 by agitating the arrangement 10. The method of agitation is implemented by operating a controller (not shown) which controls a driving device (not shown) of the grinding pipe 10 by applying a driving torque which in turn applies a driving torque to the grinding pipe 10. By varying the torque applied to the grinding pipe 10, the speed of rotation of the grinding pipe 10 and consequently the angle of rotation of the grinding pipe 10 is varied. During the frozen charge removal operation, the grinding pipe 10 is driven through an angle 16, which is a maximum of 75°, for example, to prevent the frozen charge from dropping due to gravity. In another exemplary embodiment, this angle 16 can be less than 75° depending on the type of ore. This "shaking" of the grinding pipe 10 by applying a varying driving torque results in the loosening of the frozen charge 14 from the inner wall 12 within a controlled range of angle of rotation, thus limiting the likelihood of damaged caused by the dislodging of the frozen charge 14 at an inappropriate point of rotation.

Figure 2:
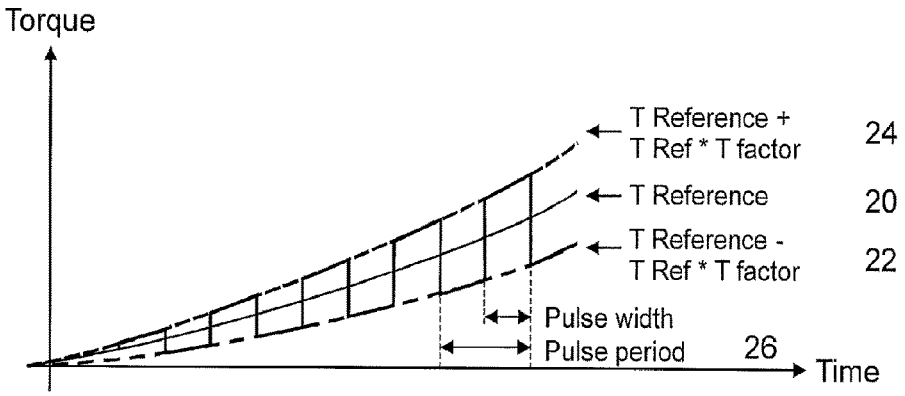
FIG. 2 is a graphical representation of torque steps applied to the grinding pipe in accordance with an exemplary embodiment of the present disclosure.

FIG. 2 is a graphical representation of torque steps applied to the grinding pipe in accordance with an exemplary embodiment of the present disclosure. FIG. 2 represents graphically the torque applied to the grinding pipe 10 plotted against time. The torque applied to the grinding pipe 10 is varied around a given reference torque T Reference 20. The pulsed torque steps applied have a given period 26 and vary around the reference torque T Reference between minimum torque T Reference−torque T Reference*Torque factor 22 and maximum torque T Reference+torque T Reference*Torque factor 24. The Torque factor is chosen in such a way that the actual applied torque does not become negative. In other words, the Torque factor is smaller than 1.

The angle of rotation through which the grinding pipe 10 is moved during the process of dislodging frozen charge 14 is limited to a maximum of 75° to ensure that the frozen charge 14 does not dislodge at a height which will cause substantial damage to the inner wall 12 of the grinding pipe 10. The angle 16 is monitored in order to ensure a proper stop before the angle reaches 75°.

After each set of torque pulses is applied and before the angle 16 reaches 75°, the grinding pipe 10 is stopped and brought back to equilibrium position (e.g., where the angle 16 is 0°). The grinding pipe 10 can then be started in the same direction or alternatively in the opposite direction and torque pulses are again applied. This process is repeated until the frozen charge is removed.

The variation around reference torque T Reference 20 oscillating within a torque range of width 2*torque T Reference*Torque factor between 22 and 24 is such that the torque applied is always positive. The application of positive torque is important, for example, for geared mills, as it prevents back-lash which causes mechanical stress on the gear teeth thus increasing the lifespan of the machinery.

The effect of the pulsed application of torque is that the frozen charge 14 is dislodged due to variation of the acceleration. Furthermore, as the torque T Reference 20 increases, the oscillation amplitude can also increase as there is more room until a negative torque would be reached.

Figure 3:
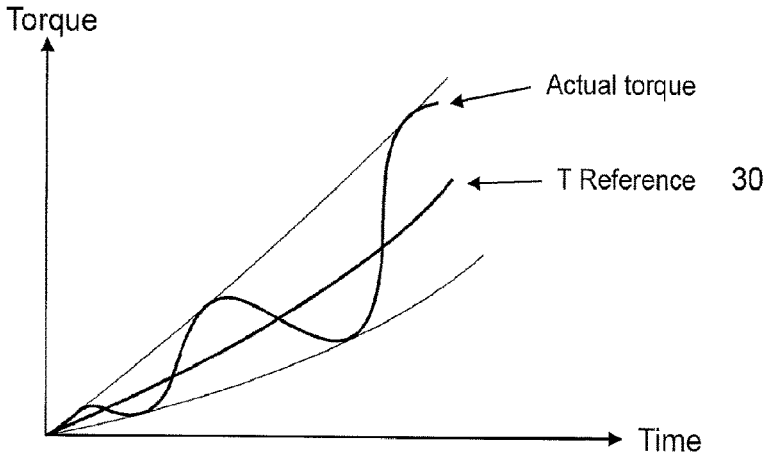
FIG. 3 is a graphical representation of a sinusoidal variation in torque applied to the grinding pipe in accordance with an exemplary embodiment of the present disclosure.

As shown in FIG. 3, an exemplary torque variation can be applied to the grinding pipe 10 and plotted against time. In this embodiment, the torque variations are applied around a positive torque T Reference 30 and are sinusoidal in pattern. The sinusoidal pattern is a "soft" torque variation such that the smoothness of the sinusoidal pattern of movement puts less stress on the drive train mechanism of the grinding pipe 10. This smooth application of torque results in the prevention of unnecessary damage to the drive train mechanism of the grinding mill. The smooth application of torque such as the sinusoidal pattern followed is less efficient in the loosening of frozen charge 14, due to the fact that the acceleration on the charge is not as high as with torque steps. As shown in the exemplary embodiment of FIG. 2, a second derivative of the driving torque with respect to time repeatedly becomes negative, while a first derivative of the driving torque may remain positive at all times.

Accordingly to other exemplary embodiments, various patterns of torque pulses or variation around a positive reference torque may be applied to the grinding pipe 10.

It will be understood that the exemplary embodiments described herein can be applied to gearless mill drives and ring-geared mill drives, with benefit to geared mill drives.

Various modifications may be made to the embodiments hereinbefore described without departing from the scope of the disclosure. For example, in an exemplary embodiment water may be applied to the frozen charge 14 before or during the torque being applied to the grinding pipe 10 to facilitate the dislodgement of the frozen charge 14 from the inner wall 12.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for detaching a frozen charge from an inner wall of a grinding pipe, the method comprising the steps of:

controlling a driving device of the grinding pipe to detach a frozen charge from an inner wall of the grinding pipe, which driving device is operable to apply a driving torque to the grinding pipe, wherein controlling the driving device comprises:

varying the driving torque applied to the grinding pipe, wherein the driving torque is always positive so that the grinding pipe does not change its rotational direction *while varying the driving torque*.

2. The method as claimed in claim 1, wherein varying the driving torque comprises varying the driving torque in a stepwise manner about [the] *a* predetermined *torque* reference level.

3. The method as claimed in claim 1, wherein varying the driving torque comprises varying the driving torque in any pattern about [the] *a* predetermined *torque* reference level and comprised within a torque range proportional to the *predetermined* torque reference level.

4. A controller for detaching a frozen charge from an inner wall of a grinding pipe, the controller comprising:

a controller operable to control a drive device of the grinding pipe to detach a frozen charge from an inner wall of the grinding pipe, which driving device is operable to apply a driving torque to the grinding pipe *in one rotation direction so that the grinding pipe does not change its rotational direction*, and vary the driving torque applied to the grinding pipe [such that the driving torque is always positive so that the grinding pipe does not change its rotational direction] *about a predetermined and increasing torque reference level*.

5. The method as claimed in claim 1, wherein varying the driving torque comprises varying the driving torque sinusoidally about [the] *a* predetermined *torque* reference level.

6. The method as claimed in claim 1, wherein controlling the driving device comprises varying the driving torque applied to the grinding pipe about a predetermined and increasing torque reference level.

*7. The method as claimed in claim 1, wherein the driving torque prevents back-lash.*

*8. The method as claimed in claim 1, wherein the driving torque is always kept in the same direction during the controlling.*

*9. The method as claimed in claim 1, wherein the driving torque is varied between a minimum torque and a maximum torque, the minimum torque always being positive.*

*10. The method as claimed in claim 1, wherein the driving torque is varied between a minimum torque and a maximum torque defined by a torque factor, the torque factor being smaller than 1.*

*11. The method as claimed in claim 1, wherein an oscillation amplitude of the driving torque increases as a predetermined torque reference level increases such that the driving torque does not reach a negative torque.*

*12. The method as claimed in claim 1, wherein the second derivative of the driving torque with respect to time repeatedly becomes negative while a first derivative of the driving torque remains positive.*

*13. The method as claimed in claim 1, wherein movement of the grinding pipe is limited to a maximum of 75° while detaching the frozen charge.*

*14. The method as claimed in claim 1, further comprising bringing the grinding pipe back toward an equilibrium position after the controlling and repeating the controlling again.*

*15. The method as claimed in claim 14, wherein the repeated controlling is in a same direction.*

*16. The method as claimed in claim 14, wherein the repeated controlling is in an opposite direction.*

*17. The method as claimed in claim 1, wherein controlling the driving device comprises varying the driving torque applied to the grinding pipe about a predetermined and increasing torque reference level, the driving torque prevents backlash, the driving torque is always kept in the same direction during the controlling, and the driving torque is varied between a minimum torque and a maximum torque, the minimum torque always being positive.*

*18. The method as claimed in claim 17, wherein an oscillation amplitude of the driving torque increases as the predetermined torque reference level increases such that the driving torque does not reach a negative torque, and the second derivative of the driving torque with respect to time repeatedly becomes negative while a first derivative of the driving torque remains positive.*

*19. The method as claimed in claim 18, wherein movement of the grinding pipe is limited to a maximum of 75° while detaching the frozen charge, and further comprising bringing the grinding pipe back toward an equilibrium position after the controlling and repeating the controlling again.*

*20. A method for detaching a frozen charge from an inner wall of a grinding pipe, the method comprising the steps of:*

*controlling a driving device of the grinding pipe to detach a frozen charge from an inner wall of the grinding pipe, which driving device is operable to apply a driving torque to the grinding pipe, wherein controlling the driving device comprises:*

*varying the driving torque applied to the grinding pipe between a minimum torque and a maximum torque, wherein the minimum torque is always positive, and the driving torque thereby preventing back-lash.*

* * * * *